United States Patent Office 3,407,147
Patented Oct. 22, 1968

3,407,147
LIQUID STYRENATED PHENOLIC ANTI-OXIDANT FOR RUBBER
Lois Elaine Chew, Middlesex, N.J., assignor to American Cyanamid Company, Stamford, Conn., a corporation of Maine
No Drawing. Filed Oct. 14, 1963, Ser. No. 316,158
4 Claims. (Cl. 252—404)

ABSTRACT OF THE DISCLOSURE

A liquid non-staining antioxidant for elastomer compositions and method of preparing it by reacting one mole part of a phenolic component composed of an m-cresol and p-cresol mixture, o-cresol, phenol and an acid-acting catalyst with two mole parts of styrene.

---

This invention relates to antioxidants for natural and synthetic elastomers. More particuarly, it relates to non-discoloring, liquid antioxidants obtained by the reaction of styrene and a specific mixture of phenol and o-, m- and p-cresols. It is also concerned with the product so produced.

Various antioxidants have been used to retard or prevent deterioration of vulcanized elastomers due to aging or exposure to the atmosphere. In the past, a number of condensation products of phenols and aromatic vinyls, such as styrenes, vinyl naphthalenes and the like, have been proposed for such use as described in United States Patents 2,224,837 and 2,506,410. The aromatic vinyl component is usually styrene. As the phenolic component, phenol, o-cresol and mixtures thereof have been proposed.

However, a suitable product for the purposes of the present invention not only must be effective as an antioxidant but must meet certain other requirements. It must be readily compatible with the elastomer mix being compounded. It must not excessively discolor compounded white or light-colored elastomer products; before, during or after vulcanization. Moreover, liquid antioxidants are desired for certain types of rubber compounding. The present invention is concerned with this latter problem.

In the past, phenolic-aromatic vinyl condensation products have proved defective in one or more of these properties. For example, products have been proposed which may seen otherwise satisfactory in most respects but will not remain liquid. They crystallize on standing. It is, therefore, a principal object of the present invention to provide phenolic-aromatic vinyl condensation products which, in use, are not subject to drawbacks found in previous products.

In view of previous difficulties, this object has been accomplished to a surprisingly successful degree by reacting styrene with a specific phenolic mixture which, in addition to the phenol and o-cresol of the past, contains m-cresol and p-cresol.

However, as thus generally stated, the apparent simplicity of the solution to the problem is more apparent than real. Not only is the use of these components necessary but they must be used with definitely prescribed proportions. Enough m- and p-cresols must be present. Otherwise delayed crystallization occurs during shipping and storage. Excessive proportions of these components may adversely affect other properties of the product mixture.

For example, in the phenolic starting mixture the mole ratio of phenol:o-cresol should be maintained between about 1:9 and about 1:3. The ratio of m- and p-cresols is not critical. However, the total amount of m- and p-cresols should comprise at least 5%, preferably at least 6%, but not more than about 20% of the phenolic mixture. Accordingly, preferred phenolic mixtures will comprise the reactants in about the following proportions. A preferred mixture also is shown.

| Component | Weight Percent | |
|---|---|---|
| | Range | Preferred |
| p-cresol | }5-20 combined | { 3-4 |
| m-cresol | | 8-10 |
| o-cresol | 68-78 | 70-73 |
| Phenol | 7-20 | 15-16 |

For purposes of simplicity in designation, such mixtures are referred to below as the "phenolics component" or "phenolics."

Although the vinyl:phenolics ratio is not wholly critical, best results are usually obtained using about two mole parts of the vinyl aromatic component, illustratively styrene; and about one mole part of the phenolics. The reaction product is a complex mixture and exact "equivalents" are not determinable and are not essential. However, if either component is to be present in excess, it should be the phenolics. After reaction, any excess of unreacted phenolics is readily removed, as by distillation. Removal of unreacted styrene is much more difficult.

Reaction requires an acid-acting catalyst, such as p-toluenesulfonic acid. Other acid-acting catalysts may be used. These include benzenesulfonic acids, xylene-sulfonic acids and sulfonated copolymers of styrene and vinyl-styrene such as found in certain commercially available ion-exchange resins. The amount of catalyst used can be varied within reasonable limits, i.e., from about 1% to 10% based on the weight of the cresol/phenol blend. For the preferred p-toluenesulfonic acid, between 1.75 and 2.25% of the total weight of the phenolics is recommended.

It is advantageous to use a reaction temperature of about 100° C., but higher or lower temperatures may be used. Lower temperatures require a longer reaction period. Temperatures that are too high, darken the product color and will result in undesirable by-products.

Reaction is carried out by slowly adding at reaction temperature the styrene to the previously mixed phenolics and catalyst. An addition time of from about one to about two hours is normally used. The reaction mixture is then held at the reaction temperature until substantially all of the styrene has reacted. Using the preferable reaction temperature of about 100° C., a reaction period of one or more hours after the completion of the addition of the styrene will be required.

After reaction is completed, the catalyst is neutralized and volatile materials, including water, are separated by distillation. Removal of the catalyst, illustratively p-toluenesulfonic acid, by conversion to its sodium salt is conveniently done by adding sodium carbonate to the reaction mixture. To prevent formation of emulsions, the sodium carbonate is added dry or with a limited amount of water. If water is used about five parts of water per part of sodium carbonate should be used.

Water and/or other volatile materials are then removed from the reaction product by heating to a temperature above the boiling point of the volatile materials, at atmospheric conditions usually to about 140° C. If vacuum is used, a temperature of 100° C. is satisfactory. Neutralized catalyst and any excess sodium carbonate then removed by filtration. If no water has been added with the sodium carbonate, filtration may be performed before removal of the volatiles.

As noted above, the product is a complex mixture consisting principally of mono-, di- and tristyrenated phenols and cresols. Typical illustrative product mixtures have given analyses within the following ranges:

| Component | Wt. Percent, Range |
|---|---|
| Unidentified products | 1.35–2.75 |
| Mono styrenated products and unreacted cresols | 7.43–11.9 |
| Distyrenated products | 80.4–85.5 |
| Tristyrenated phenol | 1.66–7.10 |
| Polystyrene | 0.72–2.49 |

Such product mixtures have been found to remain liquid over very long periods and to meet the restrictive requirements of useful activity, compatibility and adequate freedom from staining.

This invention will be further illustrated in conjunction with the following examples. Therein, unless otherwise noted, all parts and percentages are by weight and temperatures are in degrees centigrade.

Example 1

Four parts of p-toluenesulfonic acid is added to 210.4 parts of a phenolics component containing 18 phenol, 76% o-cresol and 6% of combined m- and p-cresols. The mixture is stirred and heated to 85° C., and 416% parts of styrene is added over about one hour while allowing the temperature to rise to 100° C. After holding the temperature at about 100° C. for about four hours, reaction substantially ceases. Five parts of soda ash is added, and the reaction mixture filtered. Volatile components of the filtrate are removed by distilling at 120° C. at a pressure corresponding to 20–30 mm. of mercury. A liquid residue constitutes the product. Incipient crystallization does not develop after standing in storage for over six months.

Repetition of the foregoing procedure substituting for the phenolics component, an equivalent amount of phenol, of o-cresol and of various mixtures containing some 10–30 parts of phenol and 70–90 parts of o-cresol gives liquid products which crystallize after cooling or on standing for short periods.

Example 2

To a reacted mixture prepared by the procedure of Example 1 from 210.4 parts of the phenolics component and 416.6 parts of styrene, is added 8 parts of water and 8 parts of sodium carbonate. After removing the water by heating in a vacuum, the reaction mixture is filtered. The liquid residue constitutes the product.

Example 3

A mixture of 1.9 parts of p-toluenesulfonic acid with 95 parts of a phenolics component, containing 16% phenol, 74% o-cresol, 7% m-cresol and 3% p-cresol, is heated to 90° C., and 187 parts of styrene is added over a period of about two hours while maintaining the temperature at about 100° C. The temperature of the reaction mixture is then held at about 100° C. for an additional two hours. A solution of 1.1 parts of sodium carbonate in about 4.5 parts of water is added and stirring is continued for ten minutes. Water and other volatiles are removed by heating at 100° C. under a vacuum and the residue is filtered. The liquid product amounts to about 268 parts.

Example 4

The procedure of Example 3 is followed using a phenolics component mixture containing 15% phenol, 72% o-cresol, 9% m-cresol and 3% p-cresol. After addition of the soda ash, the batch is heated to 140° C. to drive off the water and other volatiles and the neutralized catalyst is removed by filtration. The liquid product is thus obtained.

As noted above, liquid antioxidants of the present invention may be used in compounding, storing and vulcanizing compositions containing natural and/or manmade polymeric elastomers. Such procedures are wellknown in the art. No special precautions or formulations are required. Suitable elastomers include natural rubbers; polymers of butadiene-1,3, and copolymers thereof with copolymerizable monomers.

Amounts of the antioxidants of the present invention to be used vary from about 0.25 to about 5.0 weight percent of the elastomer. The specific amount varies somewhat with the elastomer and the nature of product. Antioxidant properties of the products of this invention are illustrated in the following example.

Example 5

The product of Example 3 was tested in natural rubber. Rubber stocks of the following compositions were compounded.

|  | A, parts | B, parts |
|---|---|---|
| Pale crepe rubber | 100 | 100 |
| Calcium carbonate | 60 | 60 |
| Titanium dioxide | 20 | 20 |
| Zinc oxide | 5 | 5 |
| Stearic acid | 1 | 1 |
| Sulfur | 3 | 3 |
| 2,2′-bisbenzothiazyl disulfide | 1 | 1 |
| Antioxidant (Example 3) |  | 1 |

Samples of each of the rubber stocks were cured at 141° C. for 20, 30, 40 and 50-minute periods.

Aging tests were carried out by standard procedure exposing each sample of cured rubber in (1) a cell oven for 44 hours at 100° C., and (2) an oxygen bomb for 44 hours at 80° C. with an oxygen pressure of 300 pounds per square inch. The tensile strength of each sample of cured rubber was measured before and after exposure, and the percentage strength remaining after exposure was calculated. The percent tensile strength retained is shown in Table I and is the average percent retained for the four temperatures. The percent tensile creep was measured by standard procedure at 90° C. for 44-hour and 66-hour periods. A low percent tensile creep is advantageous.

TABLE I

|  | A | B |
|---|---|---|
| Cell oven, percent tensile strength remaining | 63 | 76 |
| Oxygen bomb, percent tensile strength remaining | 48 | 76 |
| Percent tensile creep, 44 hours | 28.3 | 20.1 |
| Percent tensile creep, 66 hours | 42.8 | 28.9 |

The cured rubber samples containing the antioxidant were only slightly more discolored than the corresponding cured rubber samples containing no antioxidant.

I claim:

1. The method of preparing a liquid, non-staining antioxidant for elastomeric compositions which comprises: forming a mixture of about one mole part of a phenolic component consisting essentially in parts by weight per hundred of 5–20 parts of an m-cresol and p-cresol mixture, 68–78 parts of o-cresol and 7–20 parts of phenol and about 1–10% of an acid-acting catalyst comprising an aromatic sulfonic acid at an elevated temperature of from about 80° C. to about 110° C., slowly adding thereto about two mole parts of styrene;

holding the resultant mixture at about 90° C. to about 110° C., until reaction of the styrene substantially ceases;

neutralizing said acid-acting catalyst; and removing (a) any components volatile under atmospheric pressure at temperatures up to about 140° C., and (b) any solid material.

2. The method according to claim 1 in which said catalyst is p-toluenesulfonic acid.

3. The method according to claim 1 in which said phenolic component comprises, in parts by weight per hundred, about 3–4 parts of p-cresol,
about 8–10 parts of m-cresol,
about 70–73 parts of o-cresol, and
about 14–16 parts of phenol.

4. The liquid reaction mixture prepared according to claim 1.

References Cited

UNITED STATES PATENTS

| | | | | |
|---|---|---|---|---|
| 2,844,565 | 7/1958 | Hayes | | 260—45.95 |
| 2,900,362 | 8/1959 | Spacht | | 260—45.95 |
| 2,909,504 | 10/1959 | Spacht | | 260—45.95 |
| 3,183,273 | 5/1965 | Spacht | | 260—619 |
| 3,290,392 | 12/1966 | Ecke et al. | | 260—619 |

LEON D. ROSDOL, *Primary Examiner.*

I. GLUCK, *Assistant Examiner.*